US008695046B2

(12) United States Patent
Chen (10) Patent No.: US 8,695,046 B2
(45) Date of Patent: Apr. 8, 2014

(54) BILATERAL CONTROL SYSTEM AND METHOD OF A VEHICLE-USE FRONT SEAT AUDIO DEVICE AND A BACK SEAT ENTERTAINMENT DEVICE (75) Inventor: Stephen Chen, Changhua (TW)

(73) Assignee: E-Lead Electronic Co., Ltd., Changhua (TW)

(*) Notice: Subject to any disclaimer, the term of this patent is extended or adjusted under 35 U.S.C. 154(b) by 176 days.

(21) Appl. No.: 13/314,172

(22) Filed: Dec. 7, 2011

(65) Prior Publication Data
US 2013/0152141 A1 Jun. 13, 2013

(51) Int. Cl.
H04N 21/414 (2011.01)
(52) U.S. Cl.
USPC ............................................. 725/75; 725/74
(58) Field of Classification Search
USPC ......................................................... 725/75
See application file for complete search history.

(56) References Cited

U.S. PATENT DOCUMENTS

| 2008/0147321 A1* | 6/2008 | Howard et al. ............... 701/211 |
| 2009/0146912 A1* | 6/2009 | Hiramatsu et al. ............ 345/2.2 |
| 2012/0072109 A1* | 3/2012 | Waite et al. ................... 701/431 |

* cited by examiner

Primary Examiner — Jefferey Harold
Assistant Examiner — Justin Sanders
(74) Attorney, Agent, or Firm — Guice Patents PLLC (57) ABSTRACT The present invention is related to a bilateral control system and method of a vehicle-use front seat audio device and a back seat entertainment device according to the present invention, the system includes a vehicle-use front seat audio device, a back seat entertainment device and a connection cable, the control method is provided to copy the signals and pictures of the vehicle-use front seat audio device or the back seat entertainment device and transmit mutually by utilizing the connection cable as the bilateral transmission passageway, the signals and pictures may be mutually bilateral controlled and transmitted via the connection cable by controlling the physical keys or operating on the touch panel.

15 Claims, 7 Drawing Sheets

BILATERAL CONTROL SYSTEM AND METHOD OF A VEHICLE-USE FRONT SEAT AUDIO DEVICE AND A BACK SEAT ENTERTAINMENT DEVICE

BACKGROUND OF THE INVENTION

1. Field of the Invention

A bilateral control system and method of a vehicle-use front seat audio device and a back seat entertainment device, which utilizes the connection cable as the bilateral transmission passage, to thereby enable signals and images to bilateral control mutually and transmit through the connection cable.

2. Brief Description of the Related Art

Figure 1:
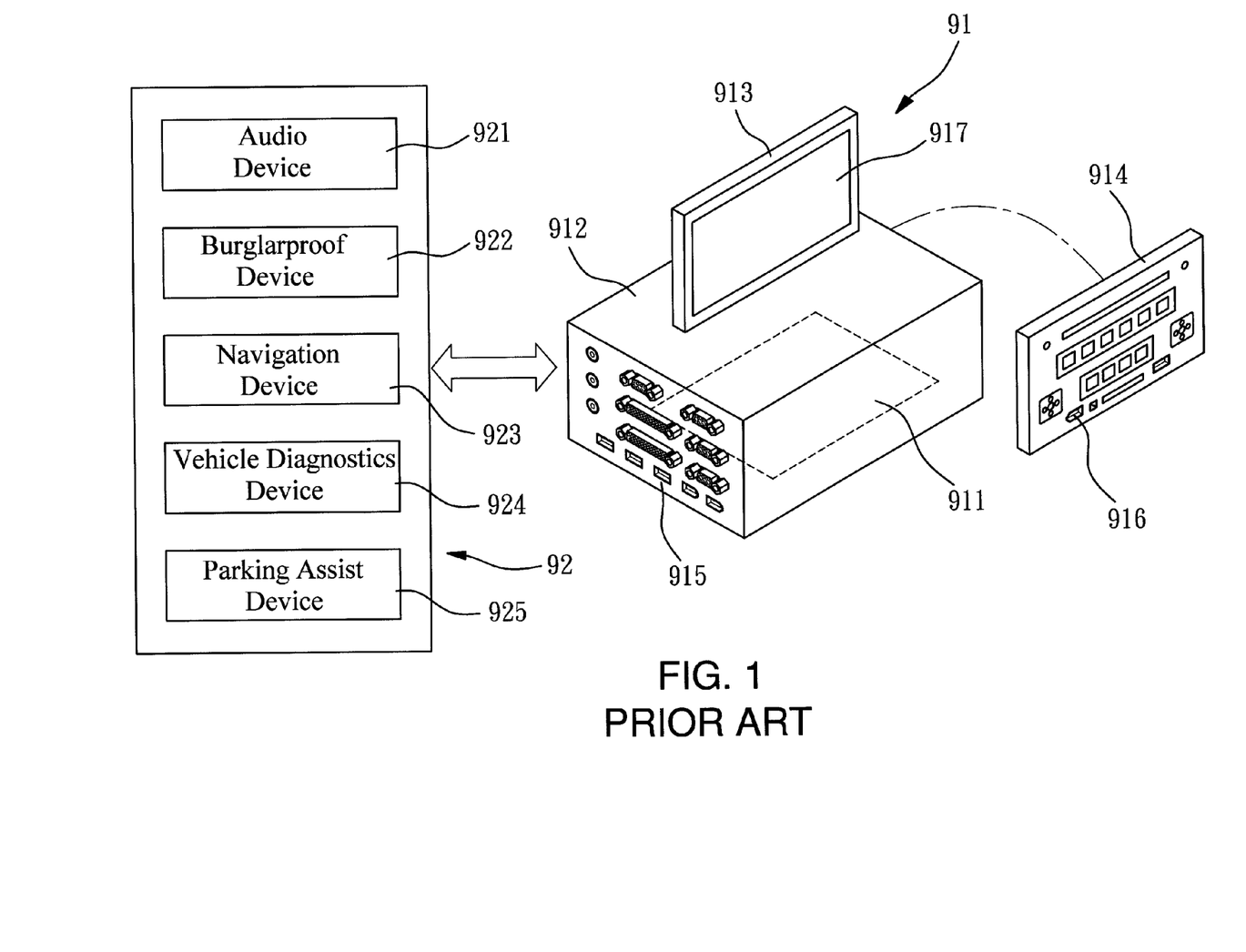
FIG. 1 is a three-dimensional exploded diagram of a conventional apparatus.

With the development, vehicle audios have more and more functions. From the radio module function as the start, the tape function is increased, and then the functions such as CD player, DVD player, navigation and Bluetooth are increased. In order to integrate these electrical devices, the field develops various relative products continuously. A computer system integrated vehicle-use electrical devices is shown in FIG. 1, which is used to control in-vehicle electrical devices 92 by a computer system 91. The electrical devices 92 include an audio device 921, a burglarproof device 922, a navigation device 923, a vehicle diagnostics device 924 and a parking assist device 925. The computer system 91 is installed a computer host 911 in a housing 912, multiple connection ports 915 are set on the rear side of the housing 912, an operation panel 914 is set on the front side of the housing 912, and the housing 912 is DIN (Deutsche Industry Normen) standard size for installing on the location of the vehicle dashboard. The computer host 911 may execute at least an operating system or at least a software program. Multiple connection sockets 916 are set on the operation panel 914 for connecting at least an external electrical device. The operation panel 914 is used to control the computer host 911, and the computer host 911 is connected to a display 913 for displaying text or image information. A touch panel 917 is set on the display 913 for touching to input data. The connection ports 915 may be used to connect to all of the electrical devices 92 in vehicle, to thereby integrated control all electrical devices 92. However, it is a single computer system, and problems in control may be happened if there are computer systems installed both on front and back seats.

Besides, other relative invention is a vehicle-use audio host with patent number US 2008/0306618A1, which is provided to imitate a human machine interface, to thereby control an electrical computing apparatus with an operating system to perform at least a predetermined task. The vehicle-use audio host includes an operation interface and a micro-control unit, the operation interface includes a trigger element and at least a working signal input element, and the micro-control unit includes an interface-function setting program. The trigger element generates a trigger signal when being triggered. The interface-function setting program may be provided for defining the predetermined task represented by the working signal input element after the micro-control unit receives the trigger signal. The micro-control unit outputs a working signal to the electrical computing apparatus when the working signal input element is triggered, to make the electrical computing apparatus perform the above predetermined task. Although the invention discloses the technique of combining the vehicle audio with computer, it is controlled by a single computer system and combined with the vehicle-use expansion apparatus, the front seat system and the back seat system may not control mutually.

SUMMARY OF THE INVENTION

In view of the defects of the conventional devices, the inventor develops a bilateral control system and method of a vehicle-use front seat audio device and a back seat entertainment device of the present invention, namely, the object of the invention is to provide a system and method for mutually bilateral controlling and transmitting through the connection cable, to thereby enable the vehicle-use front seat audio device and the back seat entertainment device to bilateral control and transmit.

To achieve the object, the bilateral control system of vehicle-use front seat audio device and back seat entertainment device according to the present invention includes a vehicle-use front seat audio device, a back seat entertainment device and a connection cable, wherein:

the vehicle-use front seat audio device, which includes a first CPU, a first sound output unit, a touch panel, a first connection interface, an A/V input key, is provided to process the operation procedure between interfaces and units by the first CPU;

the back seat entertainment device, which includes a second CPU, a second sound output unit, a second touch panel, a second connection interface, a remote control key and a OSD key group, is provided to process the operation procedure between interfaces and units by the second CPU;

the connection cable, which is connected to the first connection interface of the vehicle-use front seat audio device and the second connection interface of the back seat entertainment device, is provided to be the bilateral transmission passageway;

By the composition of the above elements, using the connection cable as the bilateral transmission passageway to send the coordinate signals on the first touch panel of the vehicle-use front seat audio device to the back seat entertainment device, send the coordinate signals on the second touch panel and the OSD key group signals of the back seat entertainment device to the vehicle-use front seat audio device, copy the picture displayed on the vehicle-use front seat audio device to the back seat entertainment device, and copy the picture displayed on the back seat entertainment device to the vehicle-use front seat audio device. The A/V input key of the vehicle-use front seat audio device and the remote control key of the back seat entertainment device are control switch keys. The vehicle-use front seat audio device and the back seat entertainment device are respectively controlled by operating the first and second touch panels to bilateral control and transmit control signals mutually through the connection cable.

The back seat entertainment device of the present invention, wherein the OSD key group is the function options displayed on the touch panel, the function of the OSD key group includes the functions of the multiple physical keys of the front seat audio device and corresponds to the operation functions of the physical keys.

The transmitted image of the present invention is a LVDS digital image.

The transmitted image of the present invention is a composite analog image.

The vehicle-use front seat audio device and the back seat entertainment device of the present invention, wherein the size of the first and second touch panels are different, and the coordinate signals on the first and second touch panels are sent after being scaling conversed into the opposite size.

The back seat entertainment device of the present invention, wherein the second touch panel further includes a main screen and a vice screen, a remote key is set on the vice screen.

The main screen and the vice screen are connected to the vehicle-use front seat audio device through an adapter box to form a mutual linking-up.

Under the base of the above bilateral control system of the present invention, its control method includes a control method of a front seat audio device and a control method of a back seat entertainment device, the vehicle-use front seat audio device and the back seat entertainment device may continuously receive images and coordinate signals sending from the opposite via a connection cable in between, but there are only one of the images and one of the coordinate signals displayed in the same time point, wherein:

the control method of the front seat audio device includes the following control steps:

step A1, starting from the picture of the vehicle-use front seat audio device, enter step A2;

step A2, the physical keys confirmation; if the physical keys corresponding to functions are pressed based on the use requirements, and the corresponding function picture is displayed on the first touch panel of the vehicle-use front seat audio device for controlling the motion of the corresponding electrical module, and then users click picture option of the first touch panel, enter step A1 after executing completely; if the physical keys are not pressed, enter step A3;

step A3, the A/V input key confirmation; if the A/V input key is pressed, the back seat entertainment device could be controlled, the operation picture of the first touch panel displays the OSD key group after pressing the A/V input key, enter step A4; if not, enter step A1;

step A4, displaying the picture of the back seat entertainment device; at the time, the picture is switched from the picture of the vehicle-use front seat audio device into the picture of the back seat entertainment device, the picture displayed on the second touch panel of the back seat entertainment device is the picture currently in-use, enter step A5;

step A5, clicking confirmation on the first touch panel; if users click to transmit the coordinate signals of the first touch panel to the back seat entertainment device, operate the electrical module function picture corresponding to coordinates on the second touch panel of the back seat entertainment device, click the picture option on the function picture, enter step A4 after executing completely; if not, enter step A6;

step A6, RSE key click confirmation; if the RSE key of the OSD key group is clicked, the vehicle-use front seat audio device relieves the control of the back seat entertainment device, enter step A1; otherwise, if not, enter step A4;

the control method of the back seat entertainment device includes the following control steps:

step B1, starting from the picture of the back seat entertainment device, enter step B2;

step B2, clicking confirmation on the second touch panel; the function picture of the back seat entertainment device is displayed according to the clicked coordinate signal of the second touch panel, and then click the picture option on the function picture, enter step B1 after executing completely; if not, enter step B3;

step B3, the remote control key confirmation, users want to control the vehicle-use front seat audio device if press the remote control key, the operation picture of the second touch panel displays the OSD key group after pressing the remote control key, and enter step B4; if not, enter step B1;

step B4, displaying the picture of the vehicle-use front seat audio device, at the time, the picture is switched from the picture of the back seat entertainment device into the picture of the vehicle-use front seat audio device, the picture of the vehicle-use front seat audio device is the picture currently in-use, enter step B5;

step B5, OSD key group click confirmation, if the OSD key group option of the function picture displayed on the second touch panel is clicked, enter step B4 after executing completely; otherwise, if not, enter step B6;

step B6, RSE key click confirmation, if the RSE key of the OSD key group is clicked, the back seat entertainment device relieves the control of the vehicle-use front seat audio device, enter step B1; otherwise, if not, enter step B4.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 2:
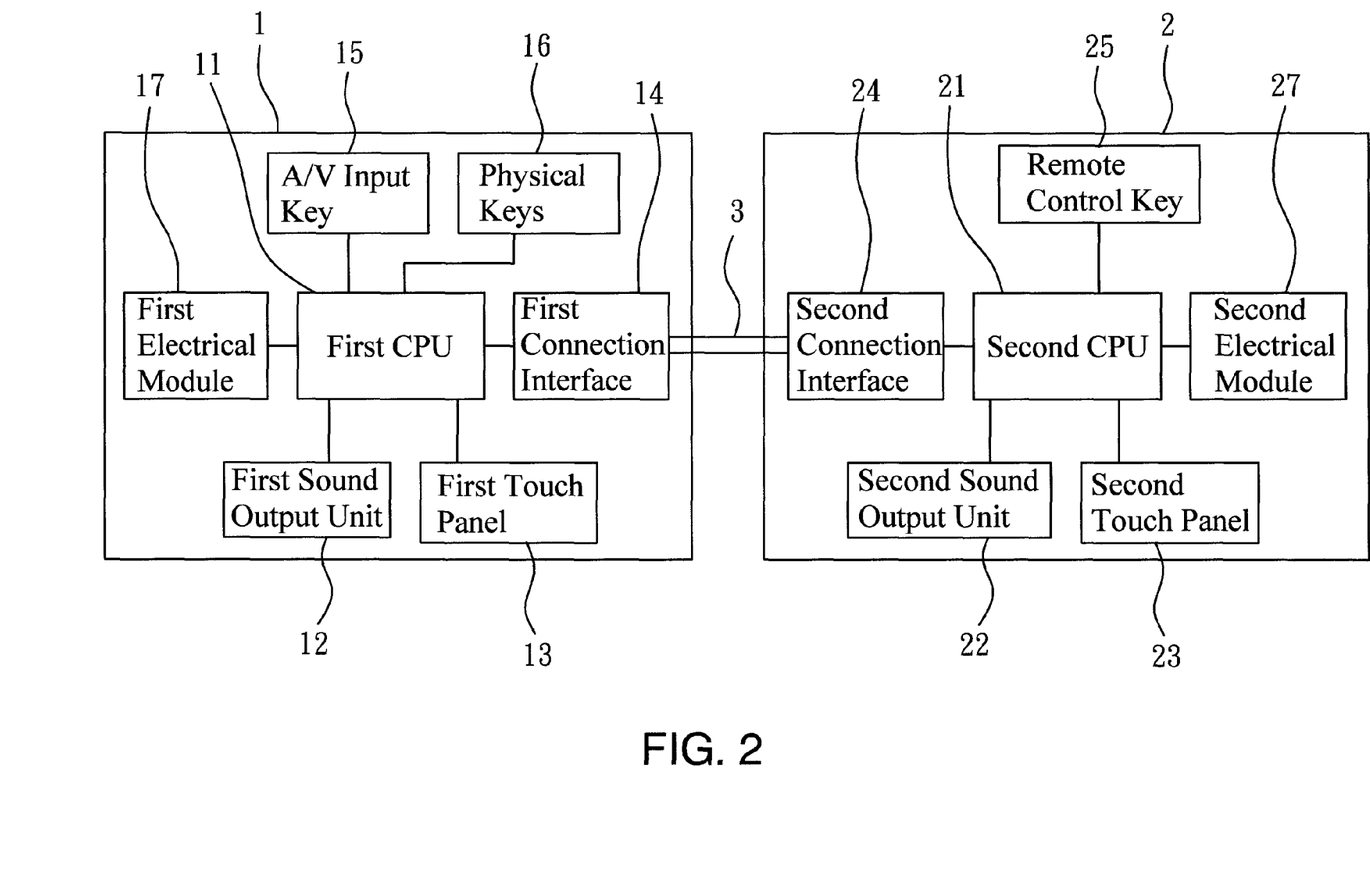
FIG. 2 is a block diagram of the present invention.
Figure 4:
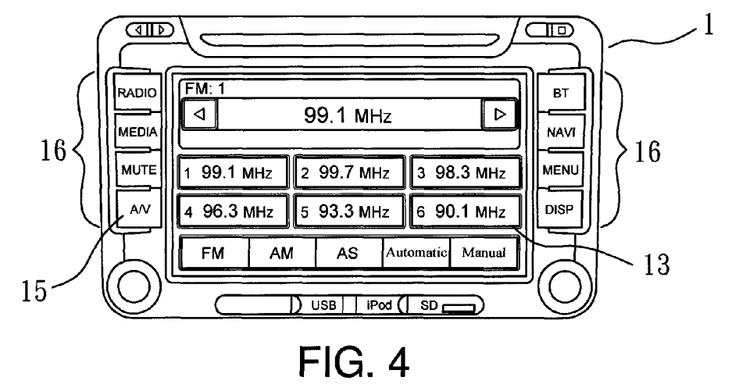
FIG. 4 is a schematic diagram (1) of the controlling method of the present invention.
Figure 8:
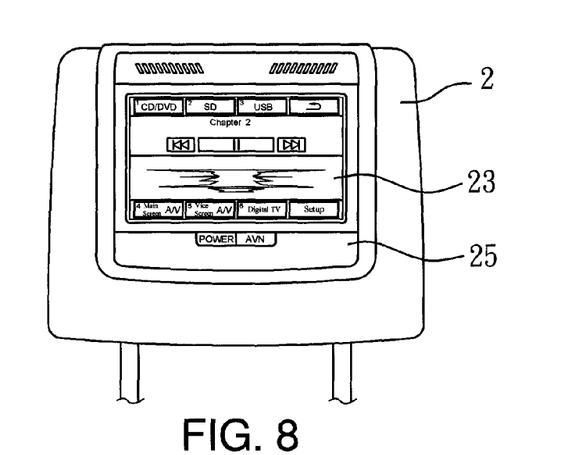
FIG. 8 is a schematic diagram (4) of the controlling method of the present invention.

As shown in FIG. 2, FIG. 4, FIG. 8, the bilateral control system of the vehicle-use front seat audio device and the back seat entertainment device includes a vehicle-use front seat audio device 1, a back seat entertainment device 2 and a connection cable 3, wherein:

the vehicle-use front seat audio device 1 includes:

a first CPU 11, which is used to integrate interfaces, process the operation procedure of audio and image, and process input signals;

a first sound output unit 12, which is connected to the first CPU 11, is used to output the audio processed by the first CPU 11; the first sound output unit 12 may be a speaker, a headphone jack, a wireless transmitter, users may insert the wired headphone into the headphone jack to hear the sounds processed by the first CPU 11 via the wired headphone; the wireless transmitter may be an IR audio modulated transmitter, a wireless audio modulated transmitter, a Bluetooth audio modulated transmitter, etc., to hear the sounds processed by the first CPU 11 via the wireless headphone;

a first touch panel 13, which is connected to the first CPU 11, is used to display the image processed by the first CPU 11, receive the operation on the first touch panel 13 and send the coordinate signal to the first CPU 11 for performing relative operation, and display the picture of the back seat entertainment device 2;

a first connection interface 14, which is connected to the connection cable 3 and the first CPU 11, is used to output the picture of the vehicle-use front seat audio device 1 and the coordinate signals on the first touch panel 13, and receive the picture of the back seat entertainment device 2, the coordinate signals of the second touch panel 23 of the back seat entertainment device 2, and the OSD key group 26 signals;

an A/V input key 15, which is connected to the first CPU 11, is a control switch key, the A/V input key 15 is used to control for switching the display picture of the vehicle-use front seat audio device 1 into the picture of the back seat entertainment device 2, to thereby control the back seat entertainment device 2 by the vehicle-use front seat audio device 1;

multiple physical keys 16, which are connected to the first CPU 11, are the control keys for executing functions of electrical modules (the physical keys 16 include: a RADIO key, which is used to control the radio module to receive channels such as AM, FM; a NAVI key, which is used to control the satellite navigation module to guide the driving direction; a BT key, which is used to control the BT module to answer the Bluetooth mobile phone or other Bluetooth products; a MEDIA key, which is used to control the multi-media playing module, the multi-media playing module is a DVD module, a USB module, a SD module, or a iPod module, and play the read file data; a MUTE key, which is used to control MUTE to let the first sound output unit 12 (or the second sound output unit 22) stop outputting; a MENU key, which is used to provide the main menu for modifying the functions such as chrominance, chrominance, saturation);

at least a first electrical module 17, which is connected to the first CPU 11, is controlled by the physical keys 16 and the OSD key group 26, and the first touch panel 13 and the second touch panel 23 to execute the corresponding function;

the back seat entertainment device 2 includes:

a second CPU 21, which is used to integrate interfaces, process the operation procedure of audio and image, and process input signals;

a second sound output unit 22, which is connected to the second CPU 21, is used to output the audio processed by the second CPU 21; the second sound output unit 22 may be a speaker, a headphone jack, a wireless transmitter, users may insert the wired headphone into the headphone jack to hear the sounds processed by the second CPU 21 via the wired headphone; the wireless transmitter may be an IR audio modulated transmitter, a wireless audio modulated transmitter, a Bluetooth audio modulated transmitter, etc., to hear the sounds processed by the second CPU 21 via the wireless headphone;

a second touch panel 23, which is connected to the second CPU 21, is used to display the image processed by the second CPU 21, receive the operation on the second touch panel 23 and send the coordinate signal to the second CPU 21 for performing relative operation, and display the picture of the vehicle-use front seat audio device 1;

a second connection interface 24, which is connected to the connection cable 3 and the second CPU 21, is used to output the picture of the back seat entertainment device 2 and the coordinate signals on the second touch panel 23, and the OSD key group 26 signals, and receive the picture of the vehicle-use front seat audio device 1 and the coordinate signals of the first touch panel 13;

a remote control key 25, which is connected to the second CPU 21, is a control switch key, the remote control key 25 is used to control for switching the display picture of the back seat entertainment device 2 into the picture of the vehicle-use front seat audio device 1, to thereby control the vehicle-use front seat audio device 1 by the back seat entertainment device 2;

the OSD key group 26, which is the function options displayed on the second touch panel 23, is provided to be clicked for operating the vehicle-use front seat audio device; the functions of the OSD key group 26 includes the functions of the multiple physical keys 16 of the front seat audio device 1 and corresponds to the operation function of the physical keys 16; users click the OSD key group 26 to operate the function picture of the vehicle-use front seat audio 1 and the displayed picture options; the function options of the OSD key group 26 includes: a RADIO option, which is used to control the radio module to receive channels such as AM, FM; a NAVI option, which is used to control the satellite navigation module to guide the driving direction; a BT option, which is used to control the BT module to answer the Bluetooth mobile phone or other Bluetooth products; a MEDIA option, which is used to control the multi-media playing module (such as a DVD module, a USB module, a SD module, or a iPod module), and play the read file data; a MUTE option, which is used to control MUTE to let the first sound output unit 12 (or the second sound output unit 22) stop outputting; a MENU option, which is used to provide the main menu for modifying the functions such as contrast, chrominance, saturation); an A/V option, which is an A/V switch key for switching to different A/V input module; a  option, which is a return key for returning the last usage mode; a VOL+ option, which is used to turn the volume up; a VOL– option, which is used to turn the volume down;

at least a second electrical module 27, which is connected to the second CPU 21, is controlled by the OSD key group 26 and the first touch panel 13 and the second touch panel 23 to execute the corresponding function;

the connection cable 3, which is connected to the first connection interface 14 of the vehicle-use front seat audio device 1 and the second connection interface 24 of the back seat entertainment device 2 as their bilateral transmission passageway.

The format of the above audio files are usually CD, MP3, AC3, DTS, WMA, karaoke, and etc., conversing text into sound may be processed to play.

The format of the above image files are MPEG I, MPEG II, MPEG IV, DivX, JPEG, M-JPEG, WMV, and etc., and the transmission images are LVDS digital images or composite analog images.

The above LVDS digital image, which uses Low-voltage differential signaling (LVDS) to transmit digital image signals. LVDS is one kind of electrical signal system, which may satisfy the current demands for high efficiency data transmission application. On the same time, the supplied power voltage is reduced to 2 volts. Thus, it is applied for the TFT LCD display devices, whose resolution is higher than SVGA, and is widely applied currently, even may be embedded into FPGA, ASIC or other elements. LVDS, USB and 1394 are all differential signals. ANSI/TIA/EIA-644 has planed "Electrical Characteristics of Low Voltage Differential Signaling (LVDS) Interface Circuits" to complete certification on November, 1995, and National Semiconductor recommended in 1994. LVDS is adopted a differential transmission way, the terminating resistor between the voltage input and output terminals needs to be 100 ohms. LVDS is allowed to adopt the connection way of Point-to-Point and Multi-Drop to achieve differential signals with using MS (Microstrip) circuit or ST (Stripline) circuit.

The composite analog image transmits analog image by using AV connector (also called Composite video connector), which is a common connector used by home A/V electrical devices for transmitting analog video (such as NTSC, PAL, SECAM). AV connector is usually a yellow RCA connector, and two red and white RCA connectors are matched for transmitting audio. SVEHICLET connector is used to replace RCA connector in European TV. due to the design, SVEHICLET may transmit RGB signals having greater picture quality than YUV, so SCRAT is also used to connect displays, video games or DVD players. In profession application, BNC connector is also used for getting a better signal quality.

The three source elements Y, U and V of the analog TV signals and the pulse signal as the synchronization reference are transmitting in the AC connector; Y represent luminance (also called brightness) of the image including the synchronization pulse, black and white TV image may be seen as long as the Y signal exists (actually, it is the compatible method of the color TV and the early black and white TV). The U signal and the V signal vehiclery the data of color. U and V are mixed to become two orthogonal phases in a signal (the mixed signal is called chrominance), and then added with the Y signal. Since Y is a baseband signal and U and V are mixed with the vehiclerier waves, the adding action is equal to frequency division multiplexing.

The first electrical module 17 of the above vehicle-use front seat audio device 1 includes a DVD module, a satellite navigation module, a Bluetooth module, a radio module, a reversing camera module, a USB module, a SD module, an iPod module and an operating system or at least a software program, and the above first electrical module 17 is connected to the first CPU 11.

The second electrical module 27 of the above back seat entertainment 2 includes a DVD module, a USB module, a SD module, a digital TV module, a vice screen module and an operating system or at least a software program, and the above second electrical module 27 is connected to the second CPU 21.

The above first electrical module 17 and the second electrical module 27 are DVD modules for playing CD, MP3, DVD and etc.

The above electrical module 17 is a satellite navigation module for guiding the driving direction.

The above electrical module 17 is a Bluetooth module for answering the Bluetooth mobile phone or other Bluetooth products.

The above electrical module 17 is a radio module for receiving channels such as AM, FM.

The above electrical module 17 is a reversing camera module for capturing the image behind the vehicle.

The above first electrical module 17 and the second electrical module 27 are USB modules for connecting to a USB device to read data storied in the connected USB device.

The above first electrical module 17 and the second electrical module 27 are SD modules for connecting to a SD vehicled to read data storied in the connected SD vehicled.

The above electrical module 17 is an iPod module for connecting to an iPod to operate.

The above first electrical module 17 and the second electrical module 27 are provided to perform at least an operating system or at least a software program, which is the operating system such as Windows CE, Windows XP, embedded LINUX, Linex or Macintosh.

The above second electrical module 27 is a digital TV module for playing digital channel programs.

The above first electrical module 17 and the second electrical module 27, users may operate through the menu of the OSD key group 26 to perform the functions of the first electrical module 17 and the second electrical module 27.

The above OSD key group 26, after pressing the remote control key 25, the OSD key group 26 displayed on the second touch panel 23 disappears automatically if there is no any operation after a setup time (such as 5 seconds).

The present invention utilizes the connection cable 3 as the bilateral transmission passageway to transmit the coordinate signals on the first touch panel 13 of the vehicle-use front seat audio device 1 to the back seat entertainment device 2, transmit the coordinate signals on the second touch panel 23 of the back seat entertainment device 2 and the OSD key group 26 signals to the vehicle-use front seat audio device 1, copy the picture of the vehicle-use front seat audio device 1 to the back seat entertainment device 2, and copy the picture of the back seat entertainment device 2 to the vehicle-use front seat audio device 1. The A/V input key 15 of the vehicle-use front seat audio device 1 and the remote control key 25 of the back seat entertainment device 2 are control switch keys. The vehicle-use front seat audio device 1 and the back seat entertainment device 2 are operated by the first touch panel 13 and the second touch panel 23 to transmit control signals through the serial transmission of the connection cable 3 to achieve the purpose of bilateral mutual control and transmission.

Figure 11:
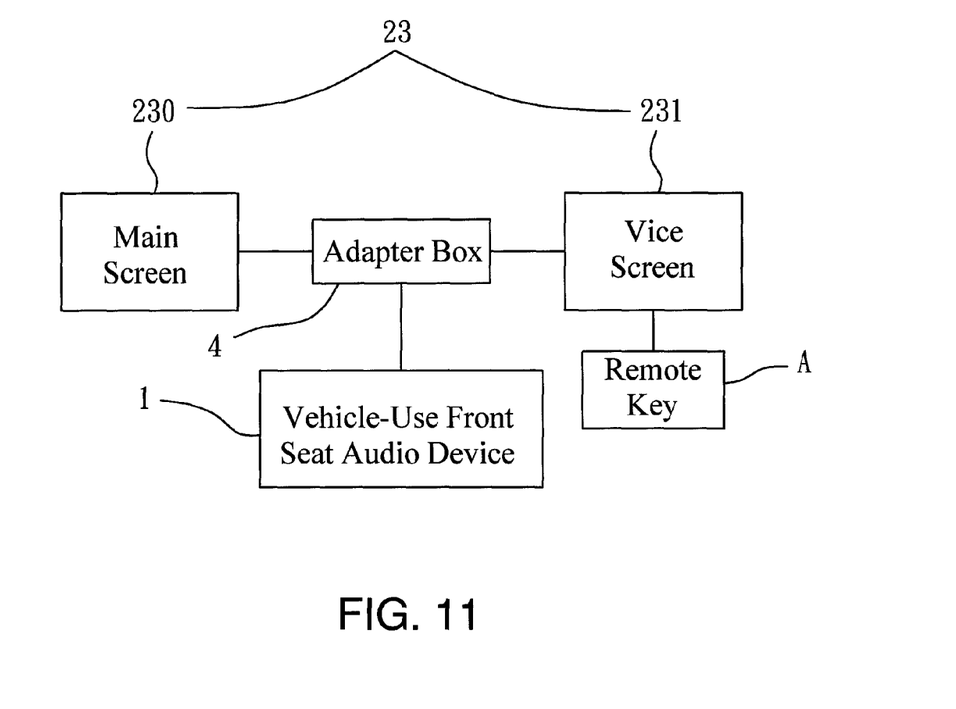
FIG. 11 is a block diagram of another embodiment of the present invention.

FIG. 11 is block diagram of another embodiment of the present invention. The second touch panel 23 of the back seat entertainment device 2 further includes a main screen 230 and a vice screen 231. A remote key A is set on the vice screen 231, the main screen 230 and the vice screen 231 are connected to the vehicle-use front seat audio device 1 through an adapter box 4. The adapter box 4 may be used to transmit the coordinate signals on the first touch panel 13 of the vehicle-use front seat audio device 1 to the main screen 230 and the vice screen 231, and also transmit the coordinate signals on the second touch panel 23 of the back seat entertainment device 2 and the OSD key signals to the vehicle-use front seat audio device 1 and the vice screen 231, and transmit the coordinate signals on the vice screen 231 of the back seat entertainment 2 and the OSD key signals to the vehicle-use front seat audio device 1 and the second touch panel 23, copy the picture of the vehicle-use front seat audio device 1 to the pictures of the main screen 23 and the vice screen 231, copy the picture of the second touch panel 23 of the back seat entertainment device 2 to the pictures of the vehicle-use front seat audio device 1 and the vice screen 231. Besides, the picture of the vice screen 231 of the back seat entertainment device 2 may also be copied to the pictures of the vehicle-use front seat audio device 1 and the second touch panel 23. The A/V input key 15, the remote control key 25 and the remote key A are control switch keys of the vehicle-use front seat audio device 1 and the main screen 23 and the vice screen 231 of the back seat entertainment 2, the control signals are mutually transmitted via the adapter box 4 to form a mutual linking-up of the three.

The above electrical module 27 is a vice screen module, which is used to display a main screen picture on the A/V menu of a vice screen picture (as a control switch key), and also display it on the vice screen 231.

Figure 12:
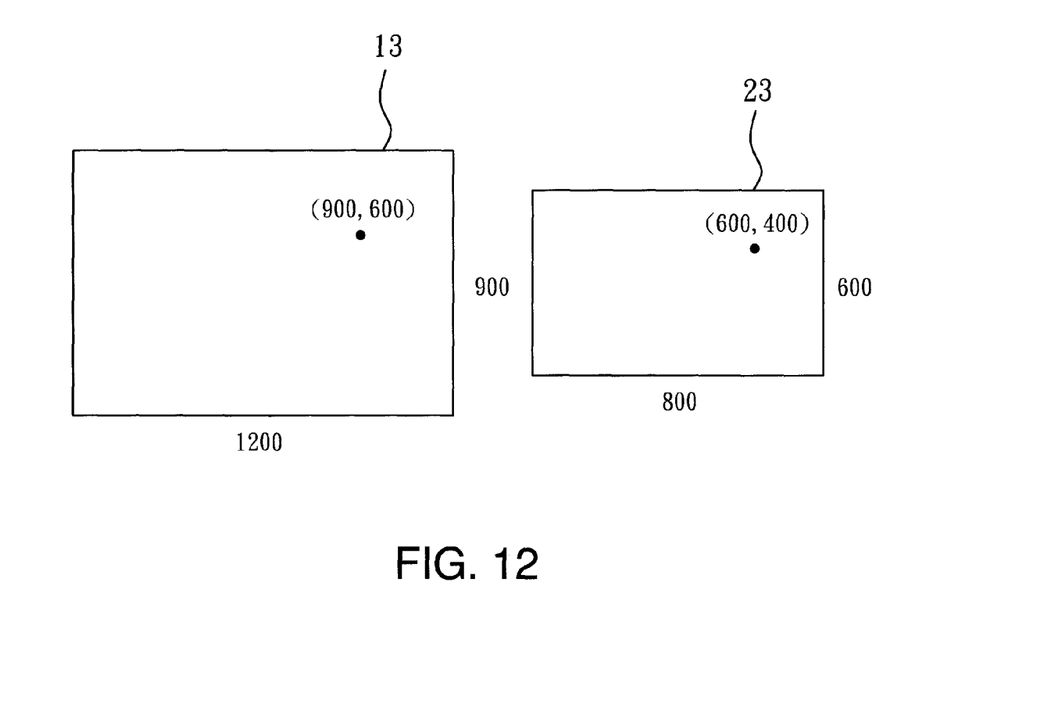
FIG. 12 is a schematic diagram of coordinate conversion of the present invention.

As shown in FIG. 12, when the size of the first touch panel 13 of the vehicle-use front seat audio device 1 and the second touch panel 23 of the back seat entertainment device 2 are different, the coordinate signals need to be conversed. For example, the resolution of the first touch panel 13 of the vehicle-use front seat audio device 1 is 1200×900, and the resolution of the second touch panel 23 of the back seat entertainment device 2 is 800×600. After being scaling conversed, the coordinate signal of (900, 600) on the first touch panel 13 is the coordinate signal of (600, 400) on the second touch panel 23. All of the coordinate signals on the first touch panel 13 and the second touch panel 23 are transmitted after being scaling conversed into the opposite size.

Figure 5:
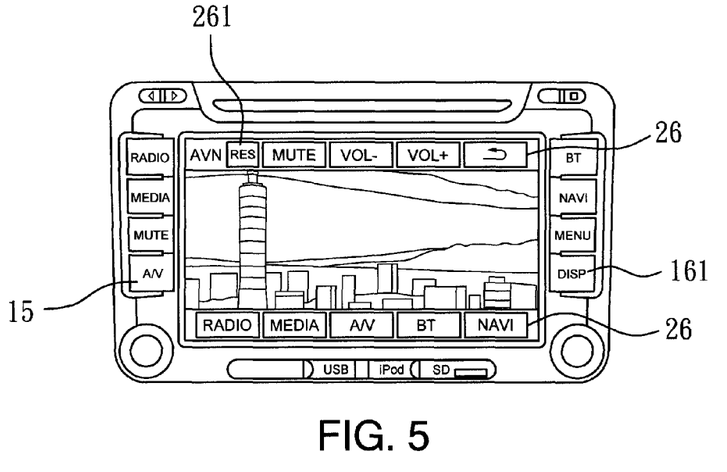
FIG. 5 is a schematic diagram (2) of the controlling method of the present invention.

In order to prevent the back seat passenger operating vehicleelessly to affect the driver controlling the front seat audio device 1, the front seat audio device 1 may be set up to have the function of refusing the control of the back seat entertainment device 2. For example, the DISP key 161 of the physical keys 16 is set up to have the function (as shown in FIG. 5), at the time, the back seat entertainment 2 could still be used to copy the displayed picture of the front seat audio device 1, but not to control the front seat audio device 1.

Under the base of the above control system of the present invention, its control method includes a control method of the front seat audio device 1 and the control method of a back seat entertainment device 2, the vehicle-use front seat audio device 1 and the back seat entertainment device 2 continuously receive images and coordinate signals sending from the opposite via the connection cable 3 in between, but only one of the pictures and one of the coordinate signals may be displayed at one time.

Figure 3:
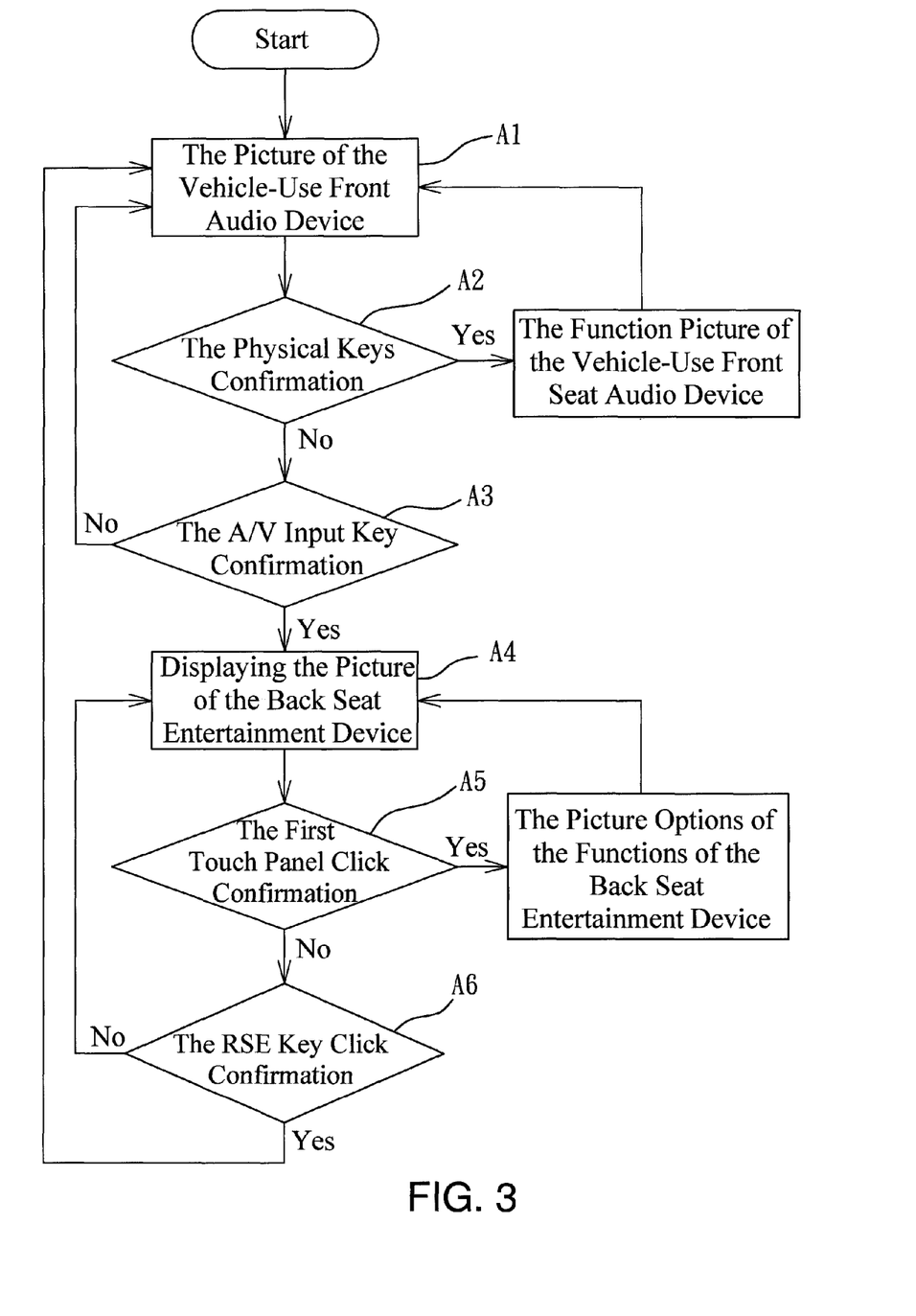
FIG. 3 is a controlling flow chart of the vehicle-use front seat audio device of the present invention.
Figure 6:
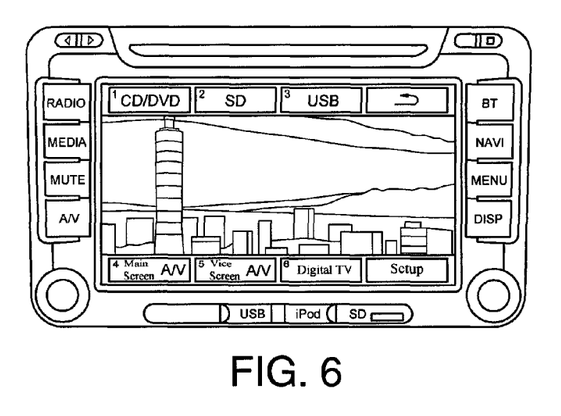
FIG. 6 is a schematic diagram (3) of the controlling method of the present invention.

As shown in FIG. 3, the control method of the front seat audio device 1 includes the following control steps:

step A1, starting from the picture of the vehicle-use front seat audio device, enter step A2;

step A2, the physical keys 16 confirmation; if the physical keys 16 corresponding to functions are pressed based on the use requirements (as shown in FIG. 4, the physical keys 16 include a RADIO key, which is used to control the radio module to receive channels such as AM, FM; a NAVI key, which is used to control the satellite navigation module to guide the driving direction; a BT key, which is used to control the BT module to answer the Bluetooth mobile phone or other Bluetooth products; a MEDIA key, which is used to control the multi-media playing module, the multi-media playing module is a DVD module, a USB module, a SD module, or a iPod module, and play the read file data; a MUTE key, which is used to control MUTE to let the first sound output unit 12 (or the second sound output unit 22) stop outputting; a MENU key, which is used to provide the main menu for modifying the functions such as constract, chrominance, saturation) and the corresponding function picture is displayed on the first touch panel 13 of the vehicle-use front seat audio device 1 for controlling the motion of the corresponding electrical module 17, and then users click picture option of the first touch panel 13 (for example, the radio function picture is displayed after pressing the RADIO key of the physical keys 16, users click the channels AM, FM, or the set channel such as  if there is no wanted channel, clicking  to make the frequency smaller, otherwise, clicking  to make the frequency larger; it needs to be kept clicking if in the manual mode, and it stops at the nearest channel when released after clicking if in the automatic mode, enter step A1 after executing completely; if the physical keys 16 are not pressed, enter step A3;

step A3, the A/V input key 15 confirmation; if the A/V input key 15 is pressed, the back seat entertainment device 2 is under control, the operation picture of the first touch panel 13 displays the OSD key group 26 after pressing the A/V input key 15, enter step A4; if not, enter step A1;

step A4, displaying the picture of the back seat entertainment device 2; after pressing the AV input key 15, the picture is switched from the picture of the vehicle-use front seat audio device 1 into the picture of the back seat entertainment device 2 (as shown in FIG. 5), at the time, the picture displayed on the touch panel 13 is the picture currently displayed on the second touch panel 23 of the back seat entertainment device 2, enter step A5;

step A5, clicking confirmation on the first touch panel 13; if users touch the first touch panel 13, the OSD key group 26 disappears automatically and the current picture of the back seat entertainment device 2 is displayed (as shown in FIG. 6); users click to transmit the coordinate signals of the first touch panel 13 to the back seat entertainment device 2, operate the electrical module function picture corresponding to coordinates on the second touch panel 23 of the back seat entertainment device 2, and click the picture option on the function picture (as shown in FIG. 6, choosing the picture options such as playing "CD/DVD" or "digital TV", "SD", "USB", "main screen A/V", "vice screen A/V", "setup", , wherein the "SD" and "USB" options are the functions of reading and playing the files, such as sound, image and audio, pictures, in the SD and USB external devices; the "main screen A/V" option is to display the picture of the main screen on a main screen picture A/V menu and the vice screen 232; the "vice screen A/V" option is to display the picture of the main screen on a vice screen picture menu and the vice screen 232; the "setup" option is provided to modify the functions such as contrast, chrominance and saturation, the  option is a return key for returning the last usage mode), enter step A4 after executing completely; if not, enter step A6;

step A6, RSE key click confirmation; if users press the RSE key 261 of the OSD key group 26 (as shown in FIG. 5), the vehicle-use front seat audio device 1 relieves the control of the back seat entertainment device 2, enter step A1; otherwise, if not, enter step A4.

According to the above steps, wherein, after pressing the A/V input key 15, the OSD key group 26 is displayed on the operation picture of the first touch panel 13 (as shown in FIG. 5). If there is no any operation after a setup time (such as 5 seconds), the OSD key group 26 is disappeared automatically and the current picture of the back seat entertainment device 2 is displayed (as shown in FIG. 6). When touching the first touch panel 13, the pictures of the vehicle-use front seat audio device 1 and the back seat entertainment device 2 are the same at the time, users may operate the back seat entertainment device 2 through the first touch panel 13.

According to the above step A6, if the OSD key group 26 disappears (as shown in FIG. 6), users may press the A/V input key 15 to display the OSD key group 26 on the operation picture (as shown in FIG. 5) once when wanting to control the vehicle-use front seat audio device 1 again. The connecting operation of the back seat entertainment device 2 is ended when clicking the RSE key 261 of the OSD key group 26 on the first touch panel 13 or directly pressing the physical keys 16 of the vehicle-use front seat audio device 1, the picture is switched to the original picture of the first touch panel 13 of the vehicle-use front seat audio device 1 (as shown in FIG. 4).

Figure 7:
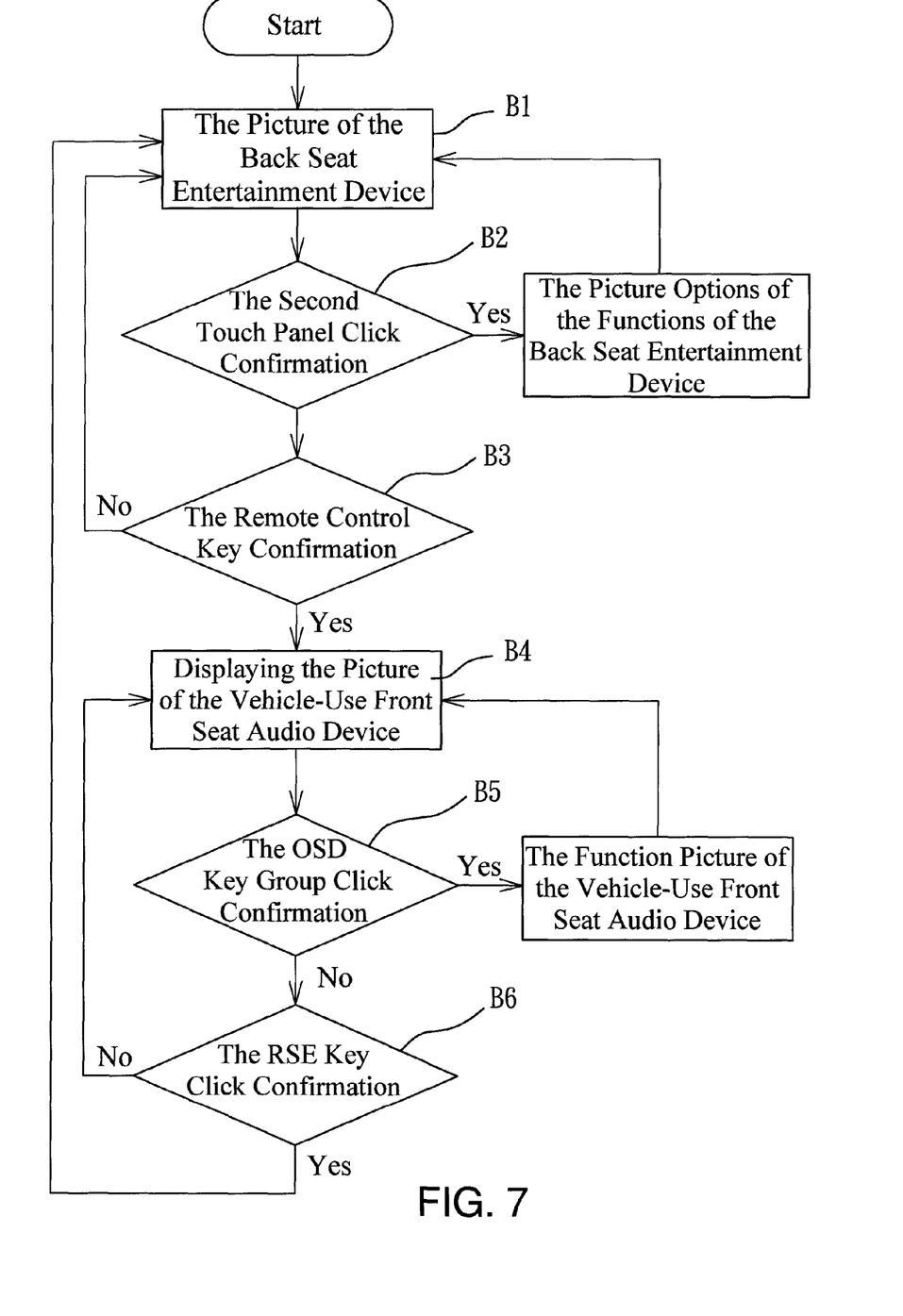
FIG. 7 is a controlling flow chart of the back seat entertainment device of the present invention.
Figure 9:
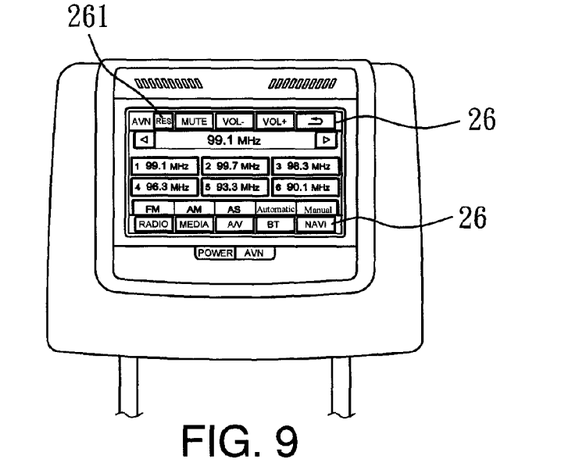
FIG. 9 is a schematic diagram (5) of the controlling method of the present invention.
Figure 10:
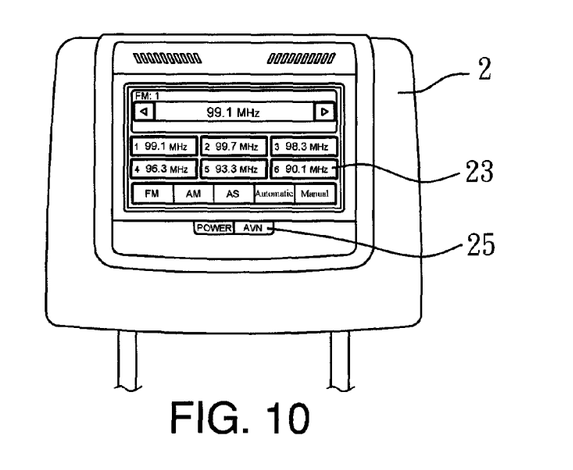
FIG. 10 is a schematic diagram (6) of the controlling method of the present invention.

As shown in FIG. 7, the control method of the back seat entertainment device 2 includes the following control steps:

step B1, starting from the picture of the back seat entertainment device 2, enter step B2;

step B2, clicking confirmation on the second touch panel 23; the function picture of the back seat entertainment device 2 is displayed according to the clicked coordinate signal of the second touch panel 23, and then click the picture option on the function picture (as shown in FIG. 8, users may choose the function options such as playing "CD/DVD" or "digital TV", "SD", "USB", "main screen A/V", "vice screen A/V", "setup", , wherein the "SD" and "USB" options are the functions of reading and playing the files, such as sound, image and audio, pictures, in the SD and USB external devices; the "main screen A/V" option is to display the picture of the main screen on a main screen picture A/V menu and the vice screen 232; the "vice screen A/V" option is to display the picture of the main screen on a vice screen picture menu and the vice screen 232; the "setup" option is provided to modify the functions such as contrast ratio, chrominance and saturation, the  option is a return key for returning the last usage mode), enter step B1 after executing completely; if not, enter step B3;

step B3, the remote control key 25 confirmation, users want to control the vehicle-use front seat audio device 1 if press the remote control key 25, the operation picture of the second touch panel 23 displays the OSD key group 26 after pressing the remote control key 25, and enter step B4; if not, enter step B1;

step B4, displaying the picture of the vehicle-use front seat audio device 1; at the time, the picture is switched from the picture of the back seat entertainment device 2 into the picture of the vehicle-use front seat audio device 1, the picture of the second touch panel 23 is the picture of the vehicle-use front seat audio device 1 currently in-use, enter step B5;

step B5, OSD key group 26 click confirmation, users may click the OSD key group 26 option of the function picture, the functions of the OSD key group is equal to the functions of the physical keys 16 of the front seat audio device 1. The OSD key group 26 includes the function options such as "RADIO", "NAVI", "BT", "MEDIA", "MUTE", "MENU", "A/V", , "VOL+", "VOL−". The motion of the corresponding functions of the electrical devices 17 are controlled by the OSD key group 26 (as shown in FIG. 9). For example, when clicking "RADIO", the OSD key group 26 disappears after clicking (as shown in FIG. 10), and users may choose the playing channel of the radio module, such as AM, FM, or the set channel such as  ; if there is no wanted channel, clicking  to make the frequency smaller, otherwise, clicking  to make the frequency larger. It needs to be kept clicking if in the manual mode, and it stops at the nearest channel when released after clicking if in the automatic mode; at the time, the pictures of the vehicle-use front seat audio device 1 and the back seat entertainment device 2 are the same; if users want to switch the picture options into other functions, such as navigation mode, pressing the remote control key 25 to switch the operation picture returning to the picture in FIG. 9 and display the OSD key group 26, and then clicking the NAVI of the OSD key group 26, the picture is switched into the navigation picture; after executing completely, enter step B4; otherwise, if not, enter step B6.

step B6, RSE key 261 click confirmation, if the RSE key 261 of the OSD key group 26 is clicked, the back seat entertainment device 2 relieves the control of the vehicle-use front seat audio device 1, enter step B1 (the connecting operation picture with the vehicle-use front seat audio device 1 is ended to become the picture in FIG. 8); otherwise, if not, enter step B4 (as shown in FIG. 9).

According the above steps, wherein, after pressing the remote control key 25, the OSD key group 26 is displayed on the operation picture of the second touch panel 23 (as shown in FIG. 9), and the OSD key group 26 is disappeared automatically (as shown in FIG. 10) if there is no any operation after a setup time (such as 5 seconds); when touching the second touch panel 23, the pictures of the vehicle-use front seat audio device 1 and the back seat entertainment device 2 are the same at the time, and users may operate the vehicle-use front seat audio device 1 via the second touch panel 23.

According to the above step B6, if the OSD key group 26 is disappeared (as shown in FIG. 10), users may press the remote control key 25 to display the OSD key group 26 on the operation picture (as shown in FIG. 9) when wanting to control the back seat entertainment device 2 again; the connecting operation with the vehicle-use front seat audio device 1 is ended when clicking the RSE key 261 of the OSD key group 26 displayed on the second touch panel 23, and the picture is switched to the original picture of the second touch panel 23 of the back seat entertainment 2 (as shown in FIG. 8).

Besides, the present invention is bilateral controlling, in order to prevent the control conflict of the vehicle-use audio device and the back seat entertainment device 2, the control method of the vehicle-use front seat audio device 1 of the present invention, wherein in the step A3, the front seat audio device 1 is set up to the mode of controlling the back seat entertainment device, and the function of controlling the front seat audio device 1 by the back seat entertainment device 2 is relieved simultaneously; otherwise, the control method of the back seat entertainment device 2 of the present invention, wherein in the step B3, the back seat entertainment device 2 is set up to the mode of controlling the front seat audio device 1, and the function of controlling the front seat audio device 1 by the back seat entertainment device 2 is relieved simultaneously.

In order to prevent the back seat passenger operating vehicleelessly to affect the driver controlling the front seat audio device 1, the front seat audio device 1 may be set up to have the function of refusing the control of the back seat entertainment device 2. A DISP key, which is set up as one of the physical keys of the front seat audio device in step A2 (as shown in FIG. 5), has the function of refusing the control of the back seat entertainment device 2. Pressing the DISP key, the back seat entertainment could still be used to copy the displayed picture of the front seat audio device 1, but not to control the front seat audio device 1 at the time.

I claim:

1. A bilateral control method for a vehicle-use front seat audio device and a back seat entertainment device, comprising:

a control method for the vehicle-use front seat audio device and a control method for the back seat entertainment device, each of the vehicle-use front seat audio device and the back seat entertainment device continuously receiving images and coordinate signals being sent from a corresponding device selected from a group consisting of the vehicle-use front seat audio device and the back seat entertainment device via a connection cable located there between and displaying a display picture, each of the vehicle-use front seat audio device and the back seat entertainment device displaying only one display picture and one of the coordinate signals at a time, the display picture is selected from a group consisting of a front seat picture and a back seat picture;

the control method of the vehicle-use front seat audio device including the following control steps:

step A1, displaying the front seat picture of the vehicle-use front seat audio device on the vehicle-use front seat audio device, go to step A2;

step A2, selecting a physical key of a plurality of physical keys located on the vehicle-use front seat audio device, when the physical key is pressed based on use requirements, a corresponding function picture is displayed on a first touch panel of the vehicle-use front seat audio device and controlling a motion of a corresponding electrical module, and then selecting a picture option of the first touch panel, go to step A1 after executing completely; when the physical key is not pressed, go to step A3;

step A3, selecting an A/V input key located on the vehicle-use front seat audio device, when the A/V input key is pressed, the back seat entertainment device is under control, an operation picture of the first touch panel displaying an OSD key group after pressing the A/V input key, go to step A4; when the A/V input key is not pressed go to step A1;

step A4, displaying the back seat picture of the back seat entertainment device on the vehicle-use front seat audio device, the display picture displaying on the vehicle-use front seat audio device is switched from the front seat picture of the vehicle-use front seat audio device to the back seat picture of the back seat entertainment device, the back seat picture displaying on the second touch panel of the back seat entertainment device is the display picture currently in-use, go to step A5;

step A5, selecting a confirmation located on the first touch panel, when the confirmation located on the first touch panel is pressed, the first touch panel transmitting the coordinate signals of the first touch panel to the back seat entertainment device, the first touch panel displaying an electrical module function picture corresponding to coordinates on the second touch panel of the back seat entertainment device, pressing a picture option on the electrical module function picture, go to step A4 after executing completely; when the confirmation is not pressed go to step A6; and step A6, selecting an RSE key of the OSD key group located on the vehicle-use front seat audio device, when the RSE key of the OSD key group is pressed, the vehicle-use front seat audio device releasing control of the back seat entertainment device, go to step A1; when the RSE key is not pressed go to step A4; and the control method of the back seat entertainment device including the following control steps:

step B1, displaying the back seat picture of the back seat entertainment device on the back seat entertainment device, go to step B2;

step B2, selecting a confirmation located on a second touch panel, when the confirmation is pressed, displaying a function picture on the back seat entertainment device according to a selected coordinate signal of the second touch panel, and then pressing a picture option on a function picture of the second touch panel, go to step B1 after executing completely; when the confirmation is not pressed go to step B3;

step B3, selecting a remote control key located on a second touch panel, when the remote control key is pressed, the back seat entertainment device controlling the vehicle-use front seat audio device, an operation picture of the second touch panel displaying an OSD key group after pressing the remote control key, and go to step B4; when the remote control key is not pressed go to step B1;

step B4, displaying the front seat picture of the vehicle-use front seat audio device on the back seat entertainment device, the display picture displaying on the back seat entertainment device is switched from the back seat picture of the back seat entertainment device to the front seat picture of the vehicle-use front seat audio device, the front seat picture of the vehicle-use front seat audio device is the display picture currently in-use, go to step B5;

step B5, selecting an OSD key group located on the back seat entertainment device, when an OSD key group option of a function picture displaying on the second touch panel is pressed, go to step B4 after executing completely; when the OSD key group is not pressed go to step B6; and step B6, selecting an RSE key, when the RSE key of the OSD key group is pressed, the back seat entertainment device releases control of the vehicle-use front seat audio device, go to step B1; when the RSE key is not pressed go to step B4;

wherein the operation picture of the first touch panel displays the OSD key group after pressing the A/V input key, and the OSD key group disappearing automatically when no operation is pressed for a setup time.

2. The bilateral control method for the vehicle-use front seat audio device and the back seat entertainment device as claimed in claim 1, wherein in the step B3, when the remote control key is pressed, the back seat entertainment device controlling the front seat audio device and the function of controlling the back seat entertainment device by the front seat audio device is released.

3. The bilateral control method for the vehicle-use front seat audio device and the back seat entertainment device as claimed in claim 1, wherein in the step A3, when the A/V input key is pressed, the front seat audio device controlling the back seat entertainment device and the function of controlling the front seat audio device by the back seat entertainment device is released.

4. A bilateral control method for a vehicle-use front seat audio device and a back seat entertainment device, comprising:

a control method for the vehicle-use front seat audio device and a control method for the back seat entertainment device, each of the vehicle-use front seat audio device and the back seat entertainment device continuously receiving images and coordinate signals being sent from a corresponding device selected from a group consisting of the vehicle-use front seat audio device and the back seat entertainment device via a connection cable located there between and displaying a display picture, each of the vehicle-use front seat audio device and the back seat entertainment device displaying only one display picture and one of the coordinate signals at a time, the display picture is selected from a group consisting of a front seat picture and a back seat picture;

the control method of the vehicle-use front seat audio device including the following control steps:

step A1, displaying the front seat picture of the vehicle-use front seat audio device on the vehicle-use front seat audio device, go to step A2;

step A2, selecting a physical key of a plurality of physical keys located on the vehicle-use front seat audio device, when the physical key is pressed based on use requirements, a corresponding function picture is displayed on a first touch panel of the vehicle-use front seat audio device and controlling a motion of a corresponding electrical module, and then selecting a picture option of the first touch panel, go to step A1 after executing completely; when the physical key is not pressed, go to step A3;

step A3, selecting an A/V input key located on the vehicle-use front seat audio device, when the A/V input key is pressed, the back seat entertainment device is under control, an operation picture of the first touch panel displaying an OSD key group after pressing the A/V input key, go to step A4; when the A/V input key is not pressed go to step A1;

step A4, displaying the back seat picture of the back seat entertainment device on the vehicle-use front seat audio device, the display picture displaying on the vehicle-use front seat audio device is switched from the front seat picture of the vehicle-use front seat audio device to the back seat picture of the back seat entertainment device, the back seat picture displaying on the second touch panel of the back seat entertainment device is the display picture currently in-use, go to step A5;

step A5, selecting a confirmation located on the first touch panel, when the confirmation located on the first touch panel is pressed, the first touch panel transmitting the coordinate signals of the first touch panel to the back seat entertainment device, the first touch panel displaying an electrical module function picture corresponding to coordinates on the second touch panel of the back seat entertainment device, pressing a picture option on the electrical module function picture, go to step A4 after executing completely; when the confirmation is not pressed go to step A6; and step A6, selecting an RSE key of the OSD key group located on the vehicle-use front seat audio device, when the RSE key of the OSD key group is pressed, the vehicle-use front seat audio device releasing control of the back seat entertainment device, go to step A1; when the RSE key is not pressed go to step A4; and the control method of the back seat entertainment device including the following control steps:

step B1, displaying the back seat picture of the back seat entertainment device on the back seat entertainment device, go to step B2;

step B2, selecting a confirmation located on a second touch panel, when the confirmation is pressed, displaying a function picture on the back seat entertainment device according to a selected coordinate signal of the second touch panel, and then pressing a picture option on a function picture of the second touch panel, go to step B1 after executing completely; when the confirmation is not pressed go to step B3;

step B3, selecting a remote control key located on a second touch panel, when the remote control key is pressed, the back seat entertainment device controlling the vehicle-use front seat audio device, an operation picture of the second touch panel displaying an OSD key group after pressing the remote control key, and go to step B4; when the remote control key is not pressed go to step B1;

step B4, displaying the front seat picture of the vehicle-use front seat audio device on the back seat entertainment device, the display picture displaying on the back seat entertainment device is switched from the back seat picture of the back seat entertainment device to the front seat picture of the vehicle-use front seat audio device, the front seat picture of the vehicle-use front seat audio device is the display picture currently in-use, go to step B5;

step B5, selecting an OSD key group located on the back seat entertainment device, when an OSD key group option of a function picture displaying on the second touch panel is pressed, go to step B4 after executing completely; when the OSD key group is not pressed go to step B6; and step B6, selecting an RSE key, when the RSE key of the OSD key group is pressed, the back seat entertainment device releases control of the vehicle-use front seat audio device, go to step B1; when the RSE key is not pressed go to step B4;

wherein the operation picture of the second touch panel displays the OSD key group after pressing the remote control key, and the OSD key group disappearing automatically when no operation is pressed for a setup time.

5. A bilateral control method for a vehicle-use front seat audio device and a back seat entertainment device, comprising:

a control method for the vehicle-use front seat audio device and a control method for the back seat entertainment device, each of the vehicle-use front seat audio device and the back seat entertainment device continuously receiving images and coordinate signals being sent from a corresponding device selected from a group consisting of the vehicle-use front seat audio device and the back seat entertainment device via a connection cable located there between and displaying a display picture, each of the vehicle-use front seat audio device and the back seat entertainment device displaying only one display picture and one of the coordinate signals at a time, the display picture is selected from a group consisting of a front seat picture and a back seat picture;

the control method of the vehicle-use front seat audio device including the following control steps:

step A1, displaying the front seat picture of the vehicle-use front seat audio device on the vehicle-use front seat audio device, go to step A2;

step A2, selecting a physical key of a plurality of physical keys located on the vehicle-use front seat audio device, when the physical key is pressed based on use requirements, a corresponding function picture is displayed on a first touch panel of the vehicle-use front seat audio device and controlling a motion of a corresponding electrical module, and then selecting a picture option of the first touch panel, go to step A1 after executing completely; when the physical key is not pressed, go to step A3;

step A3, selecting an A/V input key located on the vehicle-use front seat audio device, when the A/V input key is pressed, the back seat entertainment device is under control, an operation picture of the first touch panel displaying an OSD key group after pressing the A/V input key, go to step A4; when the A/V input key is not pressed go to step A1;

step A4, displaying the back seat picture of the back seat entertainment device on the vehicle-use front seat audio device, the display picture displaying on the vehicle-use front seat audio device is switched from the front seat picture of the vehicle-use front seat audio device to the back seat picture of the back seat entertainment device, the back seat picture displaying on the second touch panel of the back seat entertainment device is the display picture currently in-use, go to step A5;

step A5, selecting a confirmation located on the first touch panel, when the confirmation located on the first touch panel is pressed, the first touch panel transmitting the coordinate signals of the first touch panel to the back seat entertainment device, the first touch panel displaying an electrical module function picture corresponding to coordinates on the second touch panel of the back seat entertainment device, pressing a picture option on the electrical module function picture, go to step A4 after executing completely; when the confirmation is not pressed go to step A6; and step A6, selecting an RSE key of the OSD key group located on the vehicle-use front seat audio device, when the RSE key of the OSD key group is pressed, the vehicle-use front seat audio device releasing control of the back seat entertainment device, go to step A1; when the RSE key is not pressed go to step A4; and the control method of the back seat entertainment device including the following control steps:

step B1, displaying the back seat picture of the back seat entertainment device on the back seat entertainment device, go to step B2;

step B2, selecting a confirmation located on a second touch panel, when the confirmation is pressed, displaying a function picture on the back seat entertainment device according to a selected coordinate signal of the second touch panel, and then pressing a picture option on a function picture of the second touch panel, go to step B1 after executing completely; when the confirmation is not pressed go to step B3;

step B3, selecting a remote control key located on a second touch panel, when the remote control key is pressed, the back seat entertainment device controlling the vehicle-use front seat audio device, an operation picture of the second touch panel displaying an OSD key group after pressing the remote control key, and go to step B4; when the remote control key is not pressed go to step B1;

step B4, displaying the front seat picture of the vehicle-use front seat audio device on the back seat entertainment device, the display picture displaying on the back seat entertainment device is switched from the back seat picture of the back seat entertainment device to the front seat picture of the vehicle-use front seat audio device, the front seat picture of the vehicle-use front seat audio device is the display picture currently in-use, go to step B5;

step B5, selecting an OSD key group located on the back seat entertainment device, when an OSD key group option of a function picture displaying on the second touch panel is pressed, go to step B4 after executing completely; when the OSD key group is not pressed go to step B6; and step B6, selecting an RSE key, when the RSE key of the OSD key group is pressed, the back seat entertainment device releases control of the vehicle-use front seat audio device, go to step B1; when the RSE key is not pressed go to step B4;

wherein in the step A2, one physical key of the plurality of physical keys of the front seat audio device is a DISP key having a function of preventing control of the back seat entertainment device; when pressing the DISP key, the back seat entertainment device is capable of displaying the front seat picture of the vehicle-use front seat audio device and is not capable of controlling the vehicle-use front seat audio device.

6. The bilateral control method for the vehicle-use front seat audio device and the back seat entertainment device as claimed in claim 1, wherein in the step A6, the physical keys of the front seat audio device have a function for releasing control of the back seat entertainment device by the vehicle-use front seat audio device, when the physical keys are pressed go to step A1.

7. The bilateral control method for the vehicle-use front seat audio device and the back seat entertainment device as claimed in claim 1, wherein the operation picture of the second touch panel displays the OSD key group after pressing the remote control key, and the OSD key group disappearing automatically when no operation is pressed for a setup time.

8. The bilateral control method for the vehicle-use front seat audio device and the back seat entertainment device as claimed in claim 4, wherein in the step A3, when the A/V input key is pressed, the front seat audio device controlling the back seat entertainment device and the function of controlling the front seat audio device by the back seat entertainment device is released.

9. The bilateral control method for the vehicle-use front seat audio device and the back seat entertainment device as claimed in claim 4, wherein in the step B3, when the remote control key is pressed, the back seat entertainment device controlling the front seat audio device and the function of controlling the back seat entertainment device by the front seat audio device is released.

10. The bilateral control method for the vehicle-use front seat audio device and the back seat entertainment device as claimed in claim 4, wherein in the step A6, the physical keys of the front seat audio device have a function for releasing control of the back seat entertainment device by the vehicle-use front seat audio device, when the physical keys are pressed go to step A1.

11. The bilateral control method for the vehicle-use front seat audio device and the back seat entertainment device as claimed in claim 5, wherein in the step A3, when the A/V input key is pressed, the front seat audio device controlling the back seat entertainment device and the function of controlling the front seat audio device by the back seat entertainment device is released.

12. The bilateral control method for the vehicle-use front seat audio device and the back seat entertainment device as claimed in claim 5, wherein in the step B3, when the remote control key is pressed, the back seat entertainment device controlling the front seat audio device and the function of controlling the back seat entertainment device by the front seat audio device is released.

13. The bilateral control method for the vehicle-use front seat audio device and the back seat entertainment device as claimed in claim 5, wherein the operation picture of the first touch panel displays the OSD key group after pressing the A/V input key, and the OSD key group disappearing automatically when no operation is pressed for a setup time.

14. The bilateral control method for the vehicle-use front seat audio device and the back seat entertainment device as claimed in claim 5, wherein the operation picture of the second touch panel displays the OSD key group after pressing the remote control key, and the OSD key group disappearing automatically when no operation is pressed for a setup time.

15. The bilateral control method for the vehicle-use front seat audio device and the back seat entertainment device as claimed in claim 5, wherein in the step A6, the physical keys of the front seat audio device have a function for releasing control of the back seat entertainment device by the vehicle-use front seat audio device, when the physical keys are pressed go to step A1.

\* \* \* \* \*